(12) United States Patent
Kigawa et al.

(10) Patent No.: US 7,138,473 B2
(45) Date of Patent: Nov. 21, 2006

(54) SMALL PORTABLE INSTRUMENT

(75) Inventors: Keisuke Kigawa, Nishitokyo (JP); Takayuki Waseda, Nishitokyo (JP)

(73) Assignee: Citizen Watch Co., Ltd., Tokyo (JP)

( * ) Notice: Subject to any disclaimer, the term of this patent is extended or adjusted under 35 U.S.C. 154(b) by 40 days.

(21) Appl. No.: 10/276,870

(22) PCT Filed: Jun. 29, 2001

(86) PCT No.: PCT/JP01/05649

§ 371 (c)(1),
(2), (4) Date: Nov. 15, 2002

(87) PCT Pub. No.: WO02/075182

PCT Pub. Date: Sep. 26, 2002

(65) Prior Publication Data

US 2003/0102639 A1    Jun. 5, 2003

(30) Foreign Application Priority Data

Mar. 16, 2001 (JP) ............................... 2001-75310

(51) Int. Cl.
*C08F 10/08* (2006.01)
(52) U.S. Cl. ......................... 526/348.6; 63/3
(58) Field of Classification Search .............. 63/3; 526/348.6
See application file for complete search history.

(56) References Cited

U.S. PATENT DOCUMENTS

| 3,377,327 A | | 4/1968 | Gabriel |
| 4,593,062 A | * | 6/1986 | Puydak et al. ............... 524/426 |
| 5,206,301 A | * | 4/1993 | Hattori et al. ............... 525/314 |
| 6,489,402 B1 | * | 12/2002 | Ohyama et al. ......... 525/332.5 |

FOREIGN PATENT DOCUMENTS

| JP | 06-172547 A | | 6/1992 |
| JP | 06-172547 | * | 6/1994 |
| JP | 11-092748 A | | 4/1999 |

* cited by examiner

*Primary Examiner*—Robert D. Harlan
(74) *Attorney, Agent, or Firm*—The Webb Law Firm

(57) ABSTRACT

A miniature portable equipment in the present invention comprising a packing comprising a butyl rubber having a crosslinking structure composed of carbon to carbon bonds of the formula:

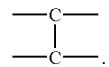

(1)

22 Claims, 6 Drawing Sheets

A-A' broken-out section of O-ring

SMALL PORTABLE INSTRUMENT

BACKGROUND OF THE INVENTION

1. Field of the Invention

The present invention relates to a miniature portable equipment having a specified packing, particularly a wristwatch having a specified packing or miniature portable information equipment terminal having a specified packing. More particularly, the present invention relates to a wristwatch of long-life specification wherein use is made of, for example, a long-life battery or a solar cell energized by conversion of light to electrical energy, or of mechanical specification wherein no battery is needed, or of specification wherein washing can be effected by the use of, for example, an ultrasonic cleaner, which wristwatch is fitted with a packing capable of inhibiting the penetration of water and steam from outside and also the penetration of human sweat and sebaceous matter, etc. and hence being excellent in long-term waterproofness.

2. Description of the Prior Art

It is demanded for miniature portable equipments, a representative example of which is a wristwatch, to be waterproof because these are daily worn.

For example, referring to FIG. 4 which shows a partial section of a wristwatch exterior component, ring-shaped waterproof rubber packings are disposed at seal portions of the wristwatch exterior component, namely, interstice between wristwatch case main body 4 and back lid 7, interstice between the case main body 4 and windshield glass 2, portion of stem 6, portion of push button, etc. With respect to the packings shown in FIG. 4, packing 3 is generally called "windshield glass packing", packing 5 as "stem O-ring", and packing 1 as "back lid O-ring". FIG. 5 shows a section from which the outline of waterproof structure for the interstice between wristwatch case main body 4 and back lid 7 is apparent. This waterproof structure is constituted of a ring-shaped elastic back lid O-ring 1 fitted in compressed condition in a concave groove formed in the back lid 7. The penetration of water from outside is inhibited, and the waterproofness for wristwatch internal parts is ensured, by compressing the back lid O-ring 1 into contact with the case main body 4 and the back lid 7 and maintaining an appropriate contact stress.

Moreover, for example, referring to FIG. 6 which is a partial sectional view of conventional wristwatch structure, stem pipe 13 is secured to wristwatch case 11, and stem 12 has ring-shaped groove 18 provided on stem shaft portion 17. Waterproof packing 15 is fitted in the ring-shaped groove 18. For time resetting, winding stem 16 is coupled with the stem shaft portion 17. In this structure, the stem shaft portion 17 of the stem 2 oscillates inside the stem pipe 13 with the waterproof packing 15 interposed therebetween. The waterproofness for the wristwatch case 11 is ensured by the waterproof packing 15 compressed into contact with the inner wall surface of stem pipe 13.

With respect to the above waterproof packing for use in the wristwatch exterior component, from the viewpoint of long-term durability of packing waterproofness, it is demanded that the packing per se be nonpermeable to water and moisture, and further that the penetration of water from the above compressed contact part do not occur, accordingly, the packing in compressed contact condition exhibits long-term wear resistance and low compression set properties.

It is common to use, as a material for the above waterproof packing, for example, a nitrile rubber which is an acrylonitrile-butadiene copolymer (hereinafter referred to as "NBR rubber"), a butyl rubber which is an isobutylene-isoprene copolymer (hereinafter referred to as "IIR rubber") or an ethylenepropylene rubber which is an ethylene-propylene-diene terpolymer (hereinafter referred to as "EPDM rubber) in accordance with a demanded specification.

However, in the above conventional method, in the use of NBR rubber as the waterproof rubber packing material, although ensuring excellent resistance to oil and wear, the NBR rubber has a drawback in that not only the water ad moisture permeabilities but also the compression set.

In the use of IIR rubber, although ensuring excellent nonpermeability to water and moisture, the IIR rubber has a drawback in that not only is the wear resistance poor but also the compression set is large.

Also, in the use of EPDM rubber, although ensuring excellent nonpermeability to water and moisture, the EPDM rubber has a drawback in that not only is the wear resistance poor but also the compression set is large.

That is, with respect to the conventional packings of synthetic rubber materials, it is difficult to satisfy both the nonpermeability to water and moisture and the low compression set, and these synthetic rubber materials have posed a problem in compression set.

Therefore, with respect to conventional wristwatches having packings constituted of the above materials, when a compressive force is exerted thereon for a prolonged period of time, the packings would suffer a plastic deformation. Thus, an appropriate contact stress cannot be maintained, so that a gap would occur at waterproof seal portions. As a result, it has been impracticable to maintain waterproof and moisture proof performance. In particular, with respect to a wristwatch of long-life specification including a movement (module) wherein use is made of, for example, a long-life battery or a solar cell energized by conversion of light to electrical energy, or a wristwatch of mechanical specification, only replacement of waterproof rubber packings must be inevitably carried out every two to three years although battery replacement is not needed to thereby fail to realize a maintenance-free wristwatch. Furthermore, there has been a problem such that waterproof failure may be brought about by washing of a wristwatch by means of an ultrasonic cleaner or the like.

Description will be made in greater detail with reference to the partial sectional view of wristwatch shown in FIG. 6.

Generally, the stem 12 inserted in the stem pipe 13 is likely to be rickety in the direction perpendicular to axial direction as much as a distance corresponding to the interstice between the circumferential surface of stem shaft portion 17 and the inner wall surface of stem pipe 13. Also, the stem 12 is likely to be rickety between the circumferential surface of stem pipe 13 and the inner wall surface of stem collar portion 14 as much as the interstice therebetween. In the use of wristwatches for a prolonged period of time, it would occur that conventional waterproof packings 15 are deteriorated per se and deformed by the deterioration of packings by influences from outside dust and human sweat with the result that the compressive contact force on the inner wall surface of stem pipe 13 is unfavorably reduced.

When a large external force, for example, one resulting from collision of a matter upon the stem 12 in water, is applied to the stem 12 provided with the waterproof packing 15 whose compressive contact force has been reduced, the stem shaft portion 17 would suffer a move interlocked with the ricketiness of the stem 12. Thus, the state of uniform compressed contact of waterproof packing 15 would be highly likely to collapse with the result that the waterproof packing 15 would be set aside. Therefore, there has been a problem such that water penetration is likely to occur at portions where the compressed contact of waterproof packing 15 has been weakened. Furthermore, when the waterproof packing is deformed, the deformation may cause such a problem that, at the rotation of stem and at the oscillation inside the stem pipe, the move would be heavy.

The present invention has been made with a view toward solving the above technological problems of the related art. Therefore, it is an object of the present invention to provide a miniature portable equipment such as a wristwatch or miniature portable information equipment terminal fitted with a packing which is excellent in not only nonpermeability to water and moisture but also compression set performance and which, even when used for long, exhibits only a slight plastic deformation to thereby ensure excellent durability. Further, with respect to wristwatches of long-life movement (module) specification, a particular object of the present invention is to provide a maintenance-free wristwatch or a wristwatch of specification wherein washing can be effected by the use of, for example, an ultrasonic cleaner.

SUMMARY OF THE INVENTION

The inventors have made extensive and intensive studies with a view toward solving the above problems. As a result, it has been found that a packing comprising a butyl rubber having a nonsulfureous crosslinking structure is excellent in not only nonpermeability to water and moisture but also compression set performance and is therefore most suitable for use in a miniature portable equipment such as wristwatch which is placed in severe use circumstances, for example, high humidity or water and for which it is demanded to be maintenance-free for a prolonged period of time. The present invention has been completed on the basis of this finding.

The terminology "packing" used herein means a rubber part used for the purpose of preventing the penetration of fluid (liquid or gas) at pipe joints, component interstices, junctions, etc., which is, for example, any of common packings, O-rings and V-rings.

Therefore, the present invention has the following characteristics.

The miniature portable equipment of the present invention comprises a packing comprising a butyl rubber having a crosslinking structure composed of carbon to carbon bonds of the formula:

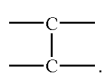

The above butyl rubber is preferably a butyl rubber having a crosslinking structure wherein no sulfur is incorporated.

Further, the butyl rubber is preferably a butyl rubber derived from a halogenated butyl rubber. This halogenated butyl rubber is preferably a chlorobutyl rubber.

The reason for the preference is that, when the halogenated butyl rubber as a principal component of rubber packing is a chlorobutyl rubber, the vulcanization performance can be enhanced.

It is preferred that the content of butyl rubber in the packing be in the range of 45.0 to 65.0% by weight.

Further, it is preferred that the packing exhibit a compression set of 15% or less as measured under a compression ratio of 25% at 80° C. after 72 hr (according to testing method specified in Japanese Industrial Standard (JIS) K6262). It is also preferred that the packing exhibit a rubber hardness of A50 to A65 as measured according to the testing method specified in Japanese Industrial Standard (JIS) K6253.

The above miniature portable equipment is preferably a wristwatch. In this wristwatch, the movement may be a movement of long-life specification wherein use is made of a long-life battery or a solar cell, or a movement of mechanical specification wherein no battery is needed.

Also, the above miniature portable equipment may be a miniature portable information equipment terminal.

As apparent from the above, the present invention is directed to a miniature portable equipment, such as a wristwatch or a miniature portable information equipment terminal, fitted with a packing comprising a specified butyl rubber. This packing contains at a given ratio the butyl rubber having a crosslinking structure constituted of a chemical structure of the above formula (1).

Illustratively, the crosslinking structure is constituted of carbon to carbon bonds. Therefore, the carbon atoms are mutually extremely stable and bonded to each other with extremely large bonding energy as compared with those of butyl rubbers having a crosslinking structure containing a sulfur crosslinking moiety (monosulfide bond, disulfide bond, polysulfide bond) represented by the formula:

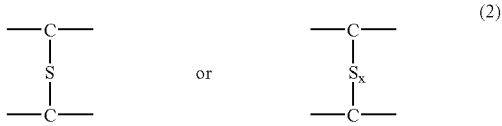

wherein x is an integer of 2 or greater.

With respect to the heat resistance and compression set, the butyl rubber of the present invention exhibits strikingly excellent performance as compared with those of conventional special-purpose rubbers.

Moreover, in the chemical structure of the above butyl rubber, there are a multiplicity of methyl groups causing a steric hindrance whose polarity is low at side chains thereof. Therefore, the gas permeability of the butyl rubber is extremely low. With respect to the water permeability and moisture permeability, water molecules of high polarity and methyl groups of low polarity oppose each other and exhibit poor miscibility. Accordingly, with respect to the nonpermeability to water molecules, the butyl rubber of the present invention exhibits strikingly excellent performance as compared with those of other special-purpose rubbers. Further, the double bond content is low, so that the possibility of being oxidized is low. Thus, the butyl rubber of the present invention is a chemically quite stable material.

Therefore, in the waterproof structure of the miniature portable equipment such as wristwatch fitted with the packing comprising the butyl rubber according to the present invention, only extremely slight water molecules can pass through the packing, and further the plastic deformation of rubber packing as measured under long-term compressive force is extremely slight (compression set small). Consequently, the waterproof structure of the present invention can maintain excellent waterproof performance and moisture proof performance for a prolonged period of time. Furthermore, with respect to the wristwatch of long-life specification comprising the movement (module) wherein use is made of, for example, a long-life battery or a solar cell energized by conversion of light to electrical energy, or the mechanical wristwatch, packing replacement can be unnecessitated to thereby realize a maintenance-free wristwatch. Still further, there can be provided a wristwatch which can be washed by the use of, for example, an ultrasonic cleaner in conformity with the strong demand from the market.

DETAILED DESCRIPTION OF THE PREFERRED EMBODIMENTS

Figure 1:
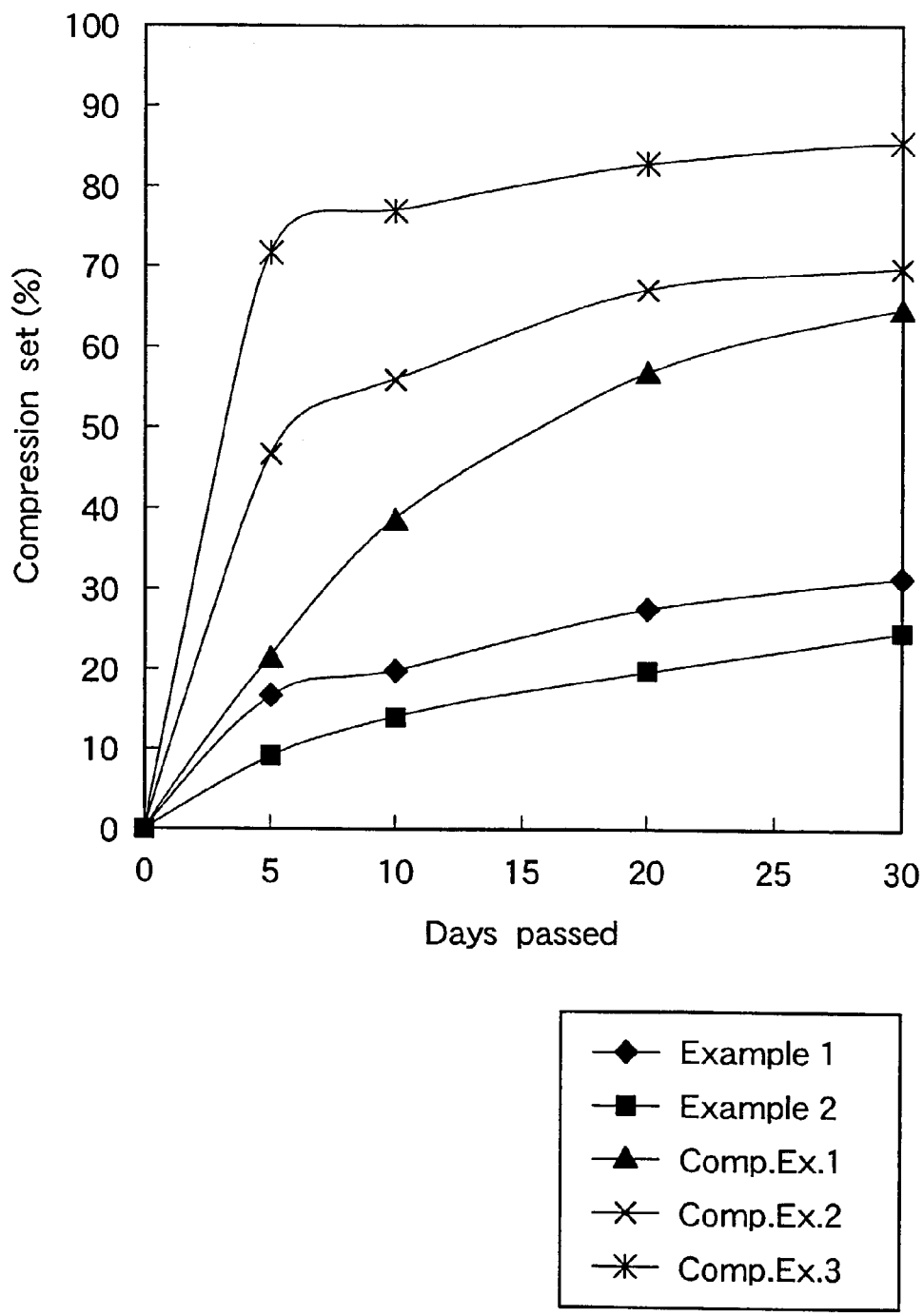
FIG. 1 is a view showing the relationship between heating compression time and compression set with respect to back lid O-rings.

The miniature portable equipment of the present invention comprises a packing comprising a butyl rubber having a crosslinking structure composed of carbon to carbon bonds of the formula:

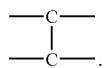  (1)

First, the above packing comprising a butyl rubber to be fitted in the miniature portable equipment of the present invention will be described.

In the packing for use in the waterproof structure of the miniature portable equipment such as wristwatch according to the present invention, it is preferred to employ a material exhibiting extremely low permeability of water molecules and exhibiting less tendency to plastic deformation even when exposed to compressive force for a prolonged period of time, which material easily restores its original shape upon cancellation of compressive force (compression set being small). The packing material contains a butyl rubber having a multiplicity of methyl groups at side chains thereof, exhibiting a low double bond content and having a crosslinking structure.

This butyl rubber with a crosslinking structure is one obtained by crosslinking common butyl rubber which is preferably a copolymer of isobutylene and a diolefin having 4 to 6 carbon atoms, still preferably a copolymer of isobutylene and isoprene. Although the ratio between units derived from isobutylene and units derived from diolefin in butyl rubber is not particularly limited and common butyl rubber can be used, it is generally preferred to use a butyl rubber comprising, for example, 95 to 99.7% by weight of isobutylene and 0.3 to 5% by weight of diolefin.

As the above butyl rubber with a crosslinking structure, it is preferred to use one obtained by crosslinking a halogenated butyl rubber containing a halogen in an amount of preferably 0.5 to 4% by weight, still preferably 1 to 2% by weight, based on halogenated butyl copolymer before crosslinking. This halogenated butyl rubber can be, for example, a chlorobutyl rubber or a brominated butyl rubber. Of these, chlorobutyl rubber is preferably used.

It is generally preferred that the Mooney viscosity of uncrosslinked butyl rubber be in the range of about 18 to 100 $ML_{1+8}$ at 100° C.

In the butyl rubber with a crosslinking structure for use in the present invention, the crosslinking structure is composed of carbon to carbon bonds of the formula (1), and is preferably a crosslinking structure wherein no sulfur is incorporated.

In the butyl rubber with a crosslinking structure obtained by crosslinking the halogenated butyl rubber, halogen atoms may remain, or all the halogen atoms may participate in crosslinking with no residual halogen atoms.

The crosslinking ratio of the butyl rubber with a crosslinking structure is not limited as long as, in the use of butyl rubber in packing, the crosslinking is not detrimental to the object of the present invention. The butyl rubber may be partially crosslinked, or may be completely crosslinked. Although the range of crosslinking is appropriately set, it is preferably, for example, from 20 to 100%, still preferably 20 to 85%.

The packing which can be used in the present invention contains at least the above butyl rubber with a crosslinking structure at a given ratio. Further, the packing may contain, as other components, a reinforcement and components derived from a curing agent. According to necessity, the packing may contain other resins and other additives.

As the curing agent, it is preferred to use a metal oxide, especially zinc oxide, for forming a crosslinking structure composed of carbon to carbon bonds. The butyl rubber with a crosslinking structure for use in the present invention preferably has a crosslinking structure wherein no sulfur is incorporated. As the curing agent, it is preferred not to use a sulfureous compound.

Examples of the reinforcements include carbon black, silica, wood powder and cork powder.

Examples of the other resins include SBR, NR, NBR and CR.

Examples of the other additives include a curing accelerator, a filler such as calcium carbonate, talc or clay, a plasticizer and a stabilizer.

From the viewpoint of the relationship between compression set property on the one hand, and rubber tensile strength and hardness on the other hand, it is preferred that the content of butyl rubber with a crosslinking structure in the above packing be in the range of 45.0 to 65.0% by weight, especially 46.0 to 60.0% by weight, based on the weight of packing.

The above reinforcement is preferably contained in an amount of 30.0 to 50.0% by weight based on the weight of packing. The components derived from a curing agent are preferably contained in an amount of 1.0 to 10.0% by weight based on the weight of packing.

Increasing of the content of butyl rubber with a crosslinking structure, although decreasing the compression set, tends to reduce, for example, the rubber reinforcing effect of carbon black added as a reinforcement.

For example, the inventors' experiment showed the following. In the use of a packing constituted of a chlorobutyl rubber with a crosslinking structure for use in the present invention at a back lid fixing portion of wristwatch, when the content of butyl rubber in the packing is less than 45.0% by weight, the compression set is large, and waterproof failure has occurred in an accelerated test. On the other hand, when the content of chlorobutyl rubber exceeds 65.0% by weight, for example, the rubber reinforcing effect of carbon black added as a reinforcement is poor, and the tensile strength and rubber hardness which are suitable for use in the rubber packing have been unattainable.

The chemical structure of the butyl rubber with a crosslinking structure for use in the present invention has a multiplicity of methyl groups at side chains and is composed of carbon to carbon bonds. This chemical structure enables obtaining a packing which is excellent in water nonpermeability and moisture nonpermeability and which exhibits an extremely small compression set as compared with those of other special-purpose rubbers.

Thus, in the present invention, it is preferred that this packing exhibit a compression set of 15% or less, especially 10% or less, as measured under a compression ratio of 25% after treatment at 80° C. for 72 hr according to the testing method specified in Japanese Industrial Standard (JIS) K6262. When the value of compression set is as mentioned above, the packing can ensure long-term waterproofness and is highly suitable for use in a wristwatch of maintenance-free long-life specification.

Moreover, in the present invention, it is also preferred that this packing exhibit a rubber hardness of A50 to A65 as measured according to the testing method specified in Japanese Industrial Standard (JIS) K6253.

For example, according to the inventors' test results, in the use of a packing constituted of a chlorobutyl rubber with a crosslinking structure for use in the present invention at a back lid fixing portion of wristwatch, when the rubber hardness is less than A50, assembly failure such as twist has occurred at the time of securing the packing to the back lid. On the other hand, when the rubber hardness exceeds A65, the content of chlorobutyl rubber in the packing becomes less than 45.0% by weight, so that the compression set becomes large and waterproof failure has occurred in an accelerated test.

The morphology of cross section of this packing is varied depending on the miniature portable equipment or site thereof wherein the packing is disposed, and hence is not particularly limited and can be appropriately selected. For example, the cross section of the packing may have any of circular, elliptic, semicircular, triangular, quadrangular, trapezoidal and doughnut shapes.

This packing can be produced by curing an uncured butyl rubber composition including an uncured butyl rubber, a curing agent and a reinforcement and optionally a curing accelerator, etc.

The content of uncured butyl rubber in the uncured butyl rubber composition is preferably in the range of 45.0 to 65.0% by weight, still preferably 45.0 to 60.0% by weight, based on the uncured butyl rubber composition.

The reinforcement is preferably contained in an amount of 30.0 to 50.0% by weight based on the uncured butyl rubber composition. The curing agent is preferably contained in an amount of 1.0 to 10.0% by weight based on the uncured butyl rubber composition.

The curing can be performed by known methods, and is not particularly limited. For example, the curing can be performed by blending an uncured butyl rubber, zinc oxide as a curing agent, carbon black as a reinforcement, a curing accelerator, etc. together, forming the resultant composition into a sheet or any other desired shape, and carrying out a press molding thereof. The heating conditions for curing reaction are not particularly limited, and, for example, the curing can be effected at a temperature for 130 to 210° C. for a period for about 5 to 60 min.

The thus obtained packing comprising the butyl rubber with the crosslinking structure composed of carbon to carbon bonds of the formula (1) is highly suitable for use in miniature portable equipments.

Examples of such miniature portable equipments include equipments for which high waterproof capability for a prolonged period of time in use is demanded, in particular, a timepiece, preferably a wristwatch, a miniature portable information equipment terminal such as a portable telephone, a time display equipment such as a stopwatch, a camera or a video, a mobile-type personal computer, an electronic calculator, a liquid crystal television, a pedometer, and portable health equipments (a clinical thermometer, an electrocardiograph, a blood pressure manometer and a heart rate meter). The packing according to the present invention is preferably used in a wristwatch or a miniature portable information equipment terminal, still preferably in a wristwatch. Moreover, the packing with the crosslinking structure according to the present invention is excellent in not only nonpermeability to water and moisture but also compression set performance and, even if used for a prolonged period of time, the plastic deformation thereof is slight to thereby ensure high durability of the packing. Therefore, the packing is especially suitable for use in a wristwatch of the movement (module) being the long-life specification, a maintenance-free wristwatch, or a wristwatch of specification wherein washing can be effected by the use of, for example, an ultrasonic cleaner.

The packing according to the present invention can be applied, for ensuring waterproofness, to a special structure of miniature portable equipment, so that, with respect to waterproof seal performance, a miniature portable equipment of superior long-term reliability can be realized.

For example, with respect to a wristwatch comprising a stem, a winding stem, a waterproof packing and a stem pipe, a wristwatch of superior long-term reliability can be obtained by, in the waterproof structure, using the above butyl rubber with a crosslinking structure which is excellent in low compression set properties as the waterproof packing and further by adding the waterproof packing to stem collar portion so that the waterproof packing is compressed into contact with the circumferential surface of stem pipe.

Figure 7:
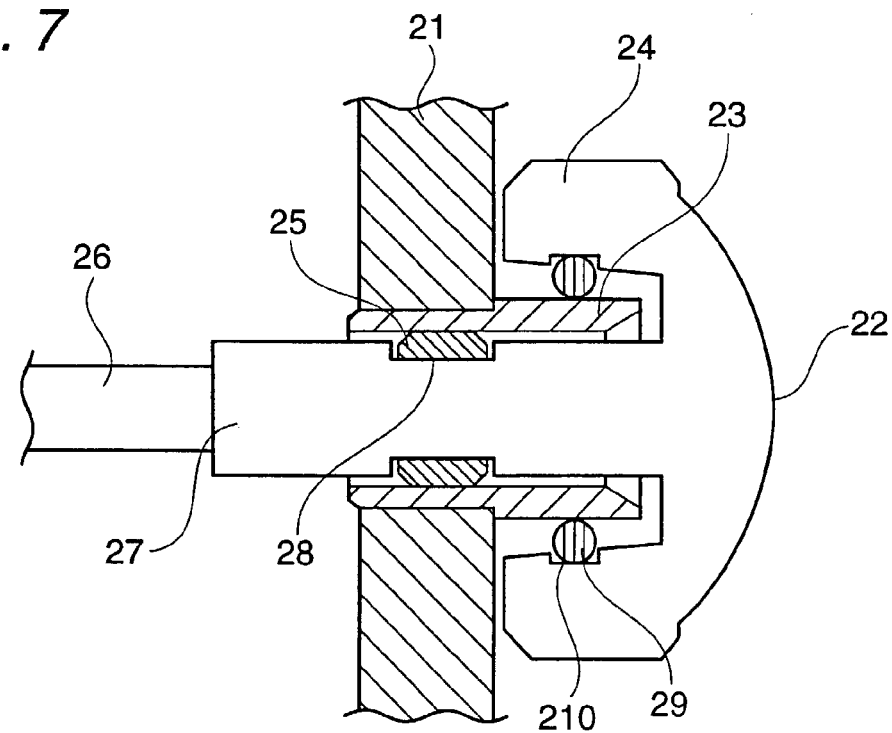
FIG. 7 is a partial sectional view of wristwatch.

For example, referring to FIG. 7, there can be mentioned a wristwatch comprising stem 22, winding stem 26, waterproof packing 28 and stem pipe 23, the stem collar portion 24 provided with ring groove 210 and fitted with waterproof packing 29.

The waterproof packing 29 provided on the stem collar portion 24 is disposed at such a position that the waterproof packing 29 is compressed into contact with the circumferential surface of stem pipe 23.

The above butyl rubber of low compression set performance not deformed for a prolonged period of time is used in the waterproof packings 25, 29. Because the butyl rubber is not deformed for a prolonged period of time, the stem can always be operated smoothly.

Compressing of the waterproof packing 29, provided on the inner wall surface of stem collar portion 24, into contact with the circumferential surface of stem pipe 23 is effective in preventing the penetration of outside dust, human sweat and water or moisture into the stem pipe 23. This enables preventing the deterioration of the waterproof packing 25 disposed in the stem pipe 23, so that highly reliable waterproof performance can be realized.

Furthermore, when a large external force, for example, one resulting from collision of a matter upon the stem 22 in water is applied to the stem 22, no ricketiness would occur because of the absence of interstice between the circumferential surface of stem pipe 23 and the stem collar portion 24. Moreover, the waterproof packings 25, 29 would not be deformed to thereby enable avoiding the shifting aside of stem 22 so that the waterproof packing 25 in the stem pipe 27 can maintain compression balance uniformly. Therefore, no water would penetrate into the internal part of wristwatch, thereby realizing a highly reliable waterproof performance.

In summing up, the deformation of the waterproof packing of a wristwatch, even after long-term use, can be avoided by the construction realized by using the above butyl rubber with a crosslinking structure as the waterproof packing and further by adding the waterproof packing to the stem collar portion so that the waterproof packing is compressed into contact with the circumferential surface of stem pipe. Hence, the stem can always be operated smoothly. Further, when a large external force, for example, one resulting from collision of a matter upon the stem in water is applied to the stem, no ricketiness would occur because of the absence of interstice between the circumferential surface of stem pipe and the inner wall surface of stem collar portion. Therefore, the uniform compressed state of the waterproof packing can be maintained to thereby enable preventing the penetration of water into the internal part of wristwatch. As a result, the wristwatch of excellent waterproofness can be obtained.

The miniature portable equipment fitted with the packing comprising the butyl rubber of crosslinking structure composed of carbon to carbon bonds according to the present invention is highly resistant to water and moisture. Even when the miniature portable equipment is used for a prolonged period of time, the plastic deformation of the packing is slight. Thus, the miniature portable equipment has excellent durability and can maintain excellent waterproof performance for a prolonged period of time. In particular, with respect to the wristwatch of long-life specification comprising the movement (module) wherein use is made of, for example, a long-life battery or a solar cell energized by conversion of light to electrical energy, or the mechanical wristwatch, waterproof packing replacement can be unnecessitated to thereby realize a maintenance-free wristwatch. Further, there can be provided the wristwatch which can be washed by the use of, for example, an ultrasonic cleaner in conformity with the strong demand from the market.

Moreover, the miniature portable equipment of the present invention can be formed into a miniature portable equipment of superior long-term waterproofness by combining the structure of miniature portable equipment with the above packing.

EXAMPLE

The present invention will be further illustrated below with reference to the following Examples and appended drawings, which, however, in no way limit the scope of the invention.

EXAMPLES 1 AND 2

Figure 4:
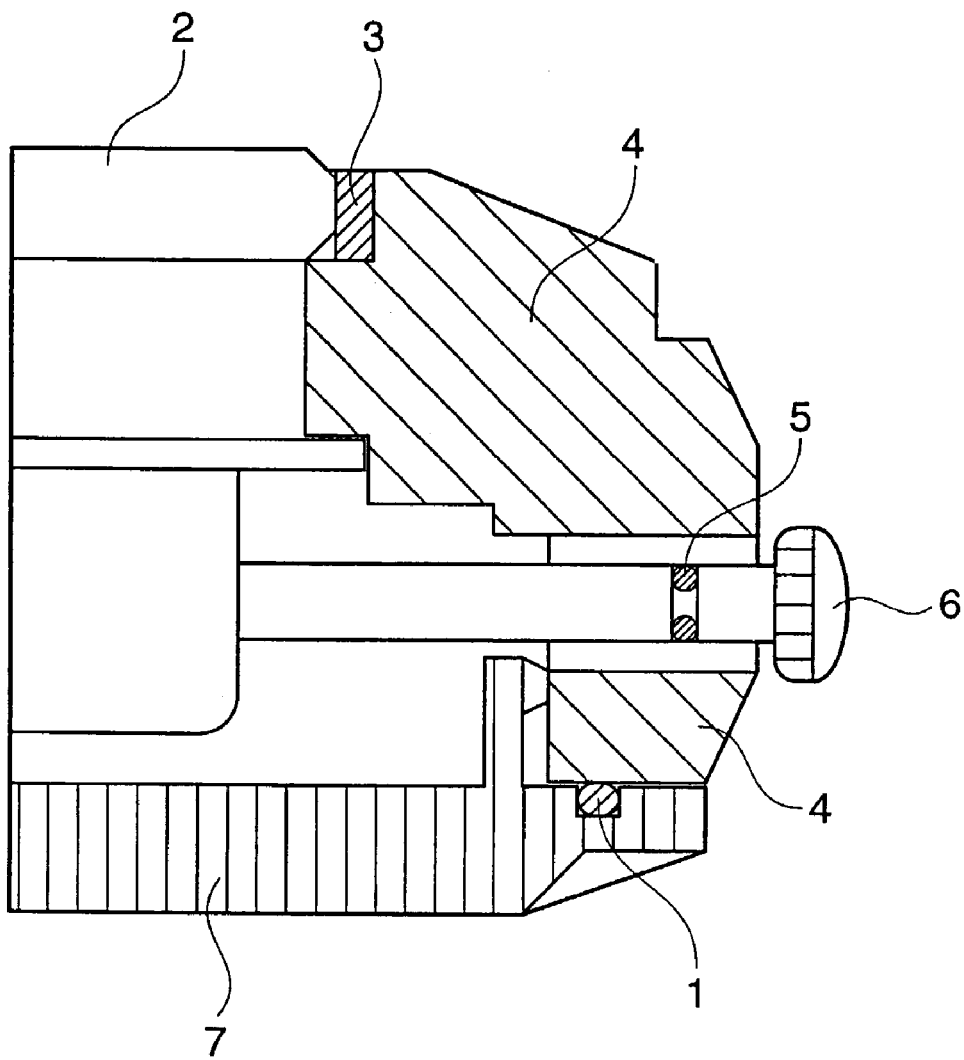
FIG. 4 is a partial sectional view of wristwatch.
Figure 5:
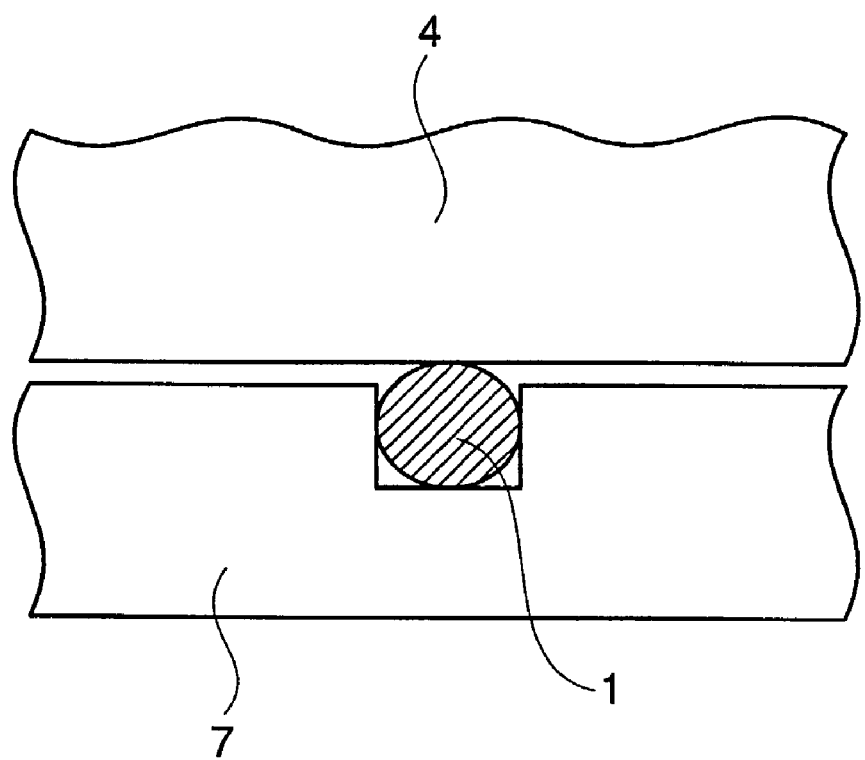
FIG. 5 is a sectional view showing the outline of waterproof structure for wristwatch.
Figure 6:
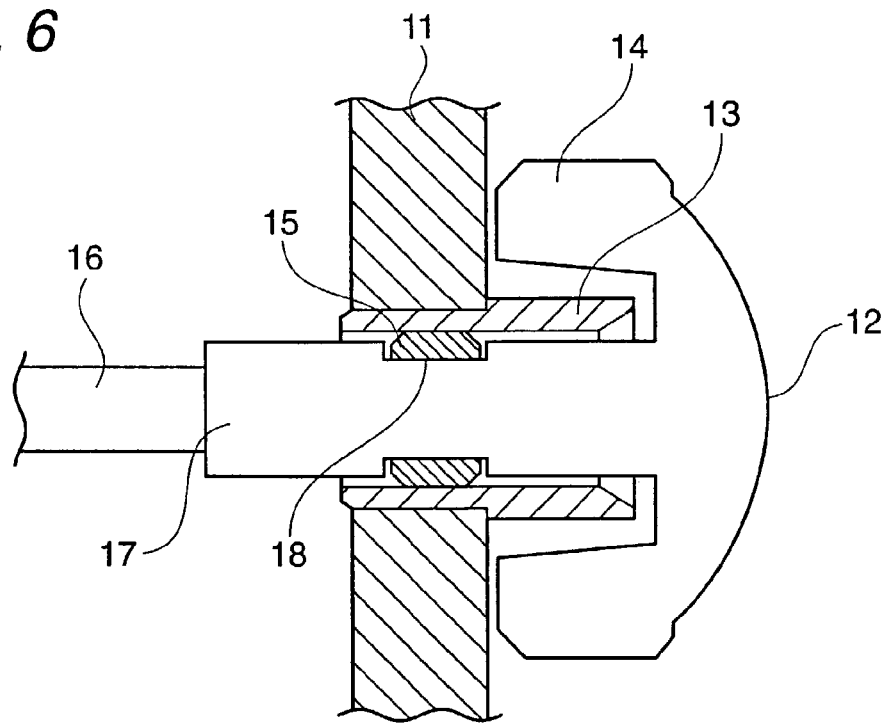
FIG. 6 is a partial sectional view of wristwatch.

FIGS. 4 and 5 are cross sectional views explaining the outline of the waterproof structure of an exterior component comprising a rubber packing.

The following description will be focused on the back lid O-ring 1 for use in the waterproof seal structure for wristwatch case main body 4 and back lid 7 as wristwatch exterior parts as shown in FIG. 5.

Chlorobutyl rubber (JSR 1068 (trade name) produced by JSR Co., Ltd.) was used as a feed rubber; zinc oxide as a curing agent; carbon black as a reinforcement; and zinc diethyldithiocarbamate (curing accelerator EZ (trade name) produced by Ouchi Shinko Chemical Industry Co., Ltd.) as a curing accelerator.

Figure 3:
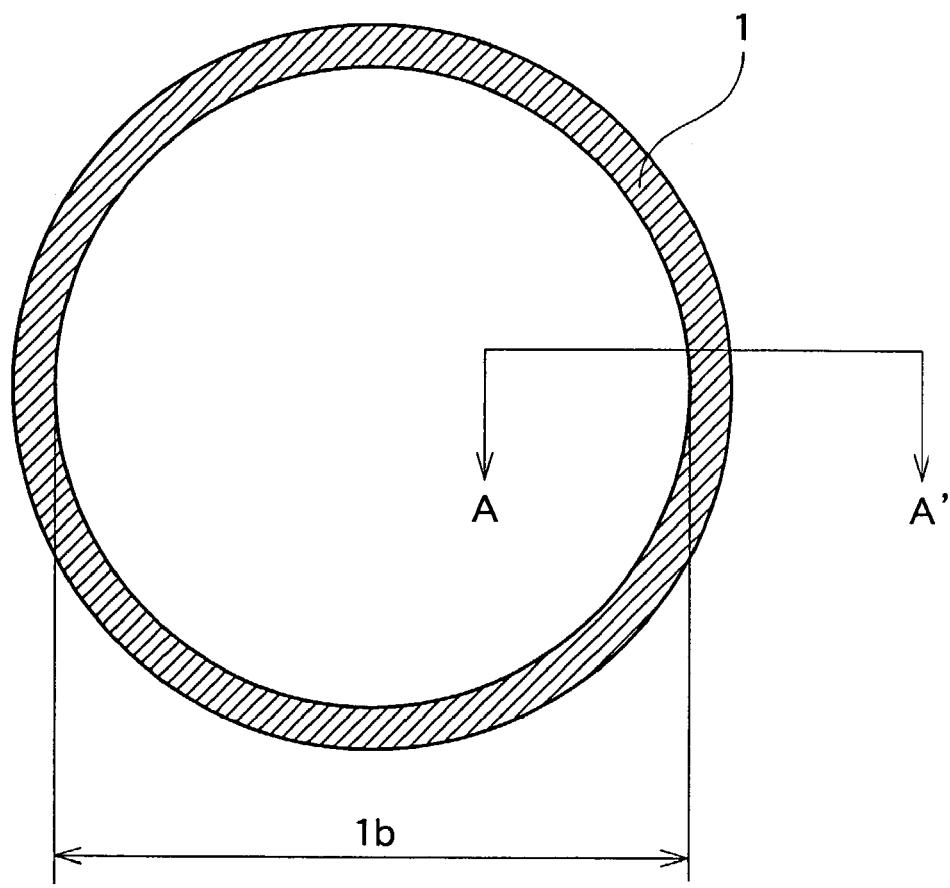
FIG. 3 is an explanatory view for back lid O-ring.
Figure 3:
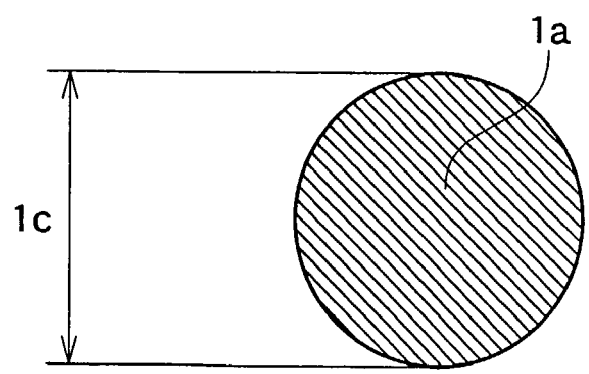

In accordance with the recipe of Table 1, for each of Examples 1 and 2, the feed rubber and ingredients were mixed and compounded together by means of a Banbury mixer or pressure kneader. Subsequently, while mixing the zinc oxide and curing accelerator thereinto, the compound was drawn so as to have a given thickness by means of an open roll mill. Thus, uncured rubber sheets were obtained. The uncured rubber sheets were cut into given shapes, and, with respect to each of Examples 1 and 2, press curing was performed at 180° C. for 5 to 10 min by means of a press molding machine. Thus, there were obtained back lid O-rings 1 for wristwatch (inside diameter 1b: 27.0 mm) having a ring shape in plan view and a circular shape in cross section 1a (ring cross section diameter 1c: 0.75 mm) as shown in FIG. 3, and further test pieces according to Japanese Industrial Standard (JIS) K6262 (diameter: 29.0 mm and thickness: 12.5 mm).

TABLE 1

| Ingredient added | Example 1 | Example 2 |
| --- | --- | --- |
| chlorobutyl rubber | 100 | 100 |
| zinc oxide | 5 | 5 |
| carbon black | 100 | 60 |
| paraffinic oil | 3 | 3 |
| curing accelerator | 1.5 | 1.5 |

(Note)
Each numeral indicates compounding ratio (pts. wt.) per 100 pts. wt. of chlorobutyl rubber.

COMPARATIVE EXAMPLES 1 to 3

Back lid O-rings 1 for wristwatch of the same size as in Examples 1 and 2 and test pieces according to Japanese Industrial Standard (JIS) K6262 were prepared in the same manner as in Examples 1 and 2, except that the feed rubber was changed as specified below.

Comparative Example 1

Sulfur-cured NBR rubber (acrylonitrile content: 36% by weight, trade name: Nipol 1041, produced by Nippon Zeon Co., Ltd.) was used as the feed rubber.

Comparative Example 2

Sulfur-cured IIR rubber (trade name: Butyl 365, produced by Japan Synthetic Rubber Co., Ltd.) was used as the feed rubber.

Comparative Example 3

Sulfur-cured EPDM rubber (trade name: M600, produced by Mitsui Chemicals, Inc.) was used as the feed rubber.

Each of the rubber products (back lid O-rings for wristwatch and test pieces according to Japanese Industrial Standard (JIS) K6262) from the rubber compositions of Examples 1 and 2 and Comparative Examples 1 to 3 was evaluated with respect to the following items (10 test pieces for each item). The test results are given in Table 2 and FIG. 1.

TABLE 2

| Evaluation item | Example 1 | Example 2 | Comp. Ex. 1 | Comp. Ex. 2 | Comp. Ex. 3 |
|---|---|---|---|---|---|
| Rubber hardness (JISK6253) | A60 | A56 | A70 | A60 | A58 |
| Compression set (JISK6262) | 9% | 8% | 16% | 37% | 64% |
| Compression set (back lid O-ring) | 32% | 25% | 65% | 70% | 86% |
| long-term 10 atm waterproof | A | A | B | B | C |
| water permeability | A | A | C | A | B |
| Moisture permeability | A | A | C | A | A |
| Silver dial discoloration | A | A | C | C | C |

(Rubber Hardness Test According to JIS K 6253)

Type A durometer hardness test was performed in accordance with Japanese Industrial Standard (JIS) K6253. Test results are listed in Table 2.

(Permanent Set Test According to JIS K 6262)

Permanent set test was performed in accordance with Japanese Industrial Standard (JIS) K6262. With respect to test conditions, the test was performed at 80±1° C. for 72 hr with a strain of 25% of thickness applied to each test piece. Use was made of test pieces of 29 mm diameter and 12.5 mm thickness. The permanent set test is one comprising compressing each test piece at a given temperature for a given period of time, removing the compressive force and measuring any residual strain. The compression set was calculated by the mathematical formula: (initial thickness−thickness after test)÷(initial thickness−thickness of test piece under compressive strain during test)×100 (%). The thickness of each test piece under a compressive strain during the test was constant and was equal to 75% of the initial thickness. The test results are listed in Table 2.

(Permanent Set Test for Back Lid O-Ring)

Permanent set test for back lid O-ring was performed with reference to the testing method specified in Japanese Industrial Standard (JIS) K6262. Referring to FIG. 3, the cross section shape 1a of each back lid O-ring was circular. Each back lid O-ring was compressed in the direction of its thickness until the contour dimension 1c became 76% of the original and, while maintaining the compression, the back lid O-ring was heated to 80° C. Thus, the permanent set test was initiated. At the initiation of the permanent set test, the squeeze of back lid O-ring was 0.18 mm (squeeze at the initiation of test=initial thickness t0 before test−thickness t2 of test piece under compressive strain). The thickness t2 of test piece under compressive strain during the test was constant and was 0.57 mm. The compression was maintained for a given period of time (5, 10, 20 or 30 days) and the compressive force was removed. The test piece of back lid O-ring was cooled to ordinary temperature, and the thickness t1 thereof was measured. The mathematical formula for calculating the compression set was as mentioned above and was: (initial thickness t0 before test−thickness t1 after test)÷(initial thickness t0 before test−thickness t2 of test piece under compressive strain during test)×100 (%).

The thickness t2 of test piece under compressive strain during the test was constant. The change of compression set upon long-term heating compression with the passage of time with respect to the back lid O-rings of rubber compositions of Examples 1 and 2 and Comparative Examples 1 to 3 is shown in FIG. 1. It is generally assumed that the accelerated testing at 80° C. for 30 days corresponds to a wristwatch wearing period of about three years. The compression set upon the passage of 30 days was 32% in Example 1 and 25% in Example 2. However, it was 65% in Comparative Example 1, 70% in Comparative Example 2 and 86% in Comparative Example 3.

Figure 2:
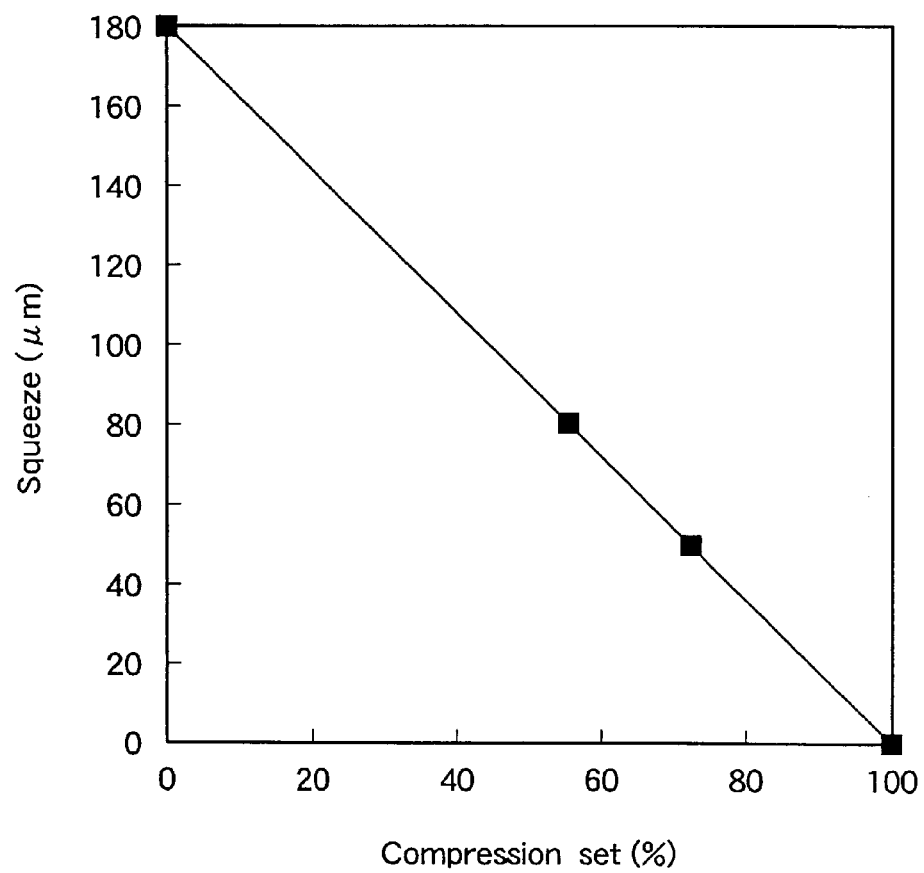
FIG. 2 is a view showing the relationship between, with respect to back lid O-rings, compression set and squeeze exhibited when fitted in a wristwatch.

Supposing that back lid O-rings with residual strains are assembled in wristwatches, the relationship between compression set and squeeze at the assembly in wristwatch with respect to the back lid O-rings (squeeze=(thickness t1 of back lid O-ring after a sequence of heating compression for a given period and cancellation of compressive force)−(thickness t2 of back lid O-ring under compressive strain)) is shown in FIG. 2. The thickness t2 of back lid O-ring under compressive strain is constant. For example, when, in such an initial condition that the residual strain of back lid O-ring is nil, the compression set is 0%, the squeeze becomes 180 μm. Further, when, in such a condition that the back lid O-ring is slightly cured to cause a plastic deformation, the compression set is 50%, the squeeze becomes 90 μm. In this connection, the prerequisite is that design values for the cross section diameter of back lid O-ring and for the compression ratio at assembly in wristwatch are 0.75 mm and 24%, respectively. Still further, the relationship between squeeze of back lid O-ring at assembly in wristwatch and 10 atm waterproofness (10 atm pressure is applied to wristwatch in water, and the penetration of water into the internal part of wristwatch is tested) has been investigated. When the squeeze is less than 50 μm (compression set greater than 72%), waterproof failure has occurred. When the squeeze is 80 μm or more (compression set not greater than 55%), waterproof performance has been excellent. When the squeeze is in the range of 50 μm to less than 80 μm, waterproof failure has occasionally occurred.

Therefore, with respect to the back lid O-rings from the rubber compositions of Examples 1 and 2, the compression set after long-term heating test performed at 80° C. for 30 days is less than 55%, so that the plastic deformation of back lid O-rings would be slight to thereby enable maintain an appropriate contact stress in the waterproof structure for a prolonged period of time. That is, the wristwatch fitted with these back lid O-rings could maintain excellent waterproofness for a prolonged period of time. On the other hand, with respect to the back lid O-rings from the rubber compositions of Comparative Examples 1 to 3, the compression set values as a result of the test performed under the same conditions exceed 55% or 72%. The wristwatch fitted with these back lid O-rings has failed to maintain waterproofness for a prolonged period of time. The compression set was valued as A when it was in the range of 0 to 55%, valued as B when it was in the range of more than 55% to 72%, and valued as C when it exceeded 72%, and the evaluation results are listed in Table 2.

(Water Permeability Test)

With respect to each of the wristwatches fitted with the back lid O-rings from the rubber compositions of Examples 1 and 2 and fitted with the back lid O-rings from the rubber compositions of Comparative Examples 1 to 3, ten test pieces were provided and immersed in 50° C. water for 2 days. These wristwatch test pieces were taken out, arranged on a hot plate having its surface heated at 70° C. and heated for 10 min. Water drop was put on each windshield glass by the use of a fountain pen filler, allowed to stand still for 30 sec., and wiped away. The degree of clouding (dew condensation) on the inside surface of windshield glass was visually evaluated.

As a result, with respect to the wristwatches fitted with the back lid O-rings of Examples 1 and 2 and Comparative Example 2, it was found that all the ten test pieces had no clouding, thereby exhibiting excellent nonpermeability to water. In contrast, all the ten test pieces suffered clouding with respect to the wristwatch fitted with the back lid O-ring of Comparative Example 1, and three out of the ten test pieces suffered clouding with respect to the wristwatch fitted with the back lid O-ring of Comparative Example 3. The clouds did not disappear even at the passage of three minutes.

The nonpermeability was valued as A when all the ten test pieces had no clouding, valued as B when 1 to 5 test pieces suffered clouding, and valued as C when 6 to 10 test pieces suffered clouding, and the evaluation results are listed in Table 2.

(Moisture Permeability Test)

The wristwatches having undergone the water permeability test were disassembled and dried. With respect to each of the thus obtained wristwatches fitted with the back lid O-rings of Examples 1 and 2 and fitted with the back lid O-rings of Comparative Examples 1 to 3, ten test pieces were placed in a chamber of high temperature and high humidity, set for 65° C. and 90%, respectively, and allowed to stand still for 5 days. These wristwatch test pieces were taken out, arranged on a hot plate having its surface heated at 70° C. and heated for 10 min. Water drop was put on each windshield glass by the use of a fountain pen filler, allowed to stand still for 30 sec., and wiped away. The degree of clouding (dew condensation) on the inside surface of windshield glass was visually evaluated. As a result, with respect to the wristwatches fitted with the back lid O-rings of Examples 1 and 2 and Comparative Examples 2 and 3, it was found that all the ten test pieces had no clouding, thereby exhibiting excellent nonpermeability to moisture. In contrast, all the ten test pieces suffered clouding with respect to the wristwatch fitted with the back lid O-ring of Comparative Example 1. The clouds did not disappear even at the passage of three minutes.

The nonpermeability was valued as A when all the ten test pieces had no clouding, valued as B when 1 to 5 test pieces suffered clouding, and valued as C when 6 to 10 test pieces suffered clouding, and the evaluation results are listed in Table 2.

(Silver Dial Discoloration Test)

With respect to each of the back lid O-rings from the rubber compositions of Examples 1 and 2 and back lid O-rings from the rubber compositions of Comparative Examples 1 to 3, a weather resistance test thereof was carried out by interposing the back lid O-ring between a glass plate and a silver dial and exposing the glass plate side to light by means of a sunshine weather meter manufactured by Suga Test Instruments Co., Ltd. The light exposure was continuously carried out for 100 hr, and thereafter the degree of discoloration of the silver dial was evaluated. The back lid O-rings of Examples 1 and 2 brought about excellent results without the discoloration of silver dial. By contrast, with respect to the back lid O-rings of Comparative Examples 1 to 3, the silver dial suffered discoloration. The back lid O-rings of Comparative Examples 1 to 3 contain sulfur for crosslinking, so that it is presumed that the sulfur will evaporate as an out gas to thereby adversely affect the silver dial.

With respect to the rubber compositions of the Examples, the recipe is not particularly limited. For example, in the use of carbon black as a reinforcement, the rubber hardness could be regulated by selecting a compounding ratio of carbon black (between 50 and 150 parts by weight). Further, the curing performance of rubber composition could be enhanced by adding a curing accelerator.

As apparent from the results of Table 2 and FIG. 1, with respect to the waterproof performance of wristwatches fitted with the rubber packings from the rubber compositions of the Examples, the initial performance of water nonpermeability and moisture nonpermeability is excellent, and the excellent performance can be maintained even when the wristwatches are used for a prolonged period of time. Moreover, discoloration or other problems as to a metal material, for example, silver as a wristwatch exterior component, even if used for long, have thoroughly been resolved.

The performance to silver dial was valued as A when there was no discoloration, and valued as C when discoloration occurred, and the evaluation results are listed in Table 2.

What is claimed is:

1. A miniature portable equipment comprising a packing comprising a butyl rubber having a crosslinking structure composed of carbon to carbon bonds of the formula:

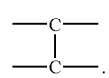

wherein the butyl rubber is a butyl rubber having a crosslinking structure wherein no sulfur is incorporated and is derived from a halogenated butyl rubber.

2. The miniature portable equipment as claimed in claim 1, wherein the halogenated butyl rubber is a chlorobutyl rubber.

3. The miniature portable equipment as claimed in claim 1, wherein the butyl rubber is contained in the packing in an amount of 45.0 to 65.0% by weight.

4. The miniature portable equipment as claimed in claim 1, wherein the packing exhibits a compression set of 15% or less as measured under a compression ratio of 25% at 80° C. after 72 hr (according to testing method specified in Japanese Industrial Standard (JIS) K6262).

5. The miniature portable equipment as claimed in claim 1, wherein the packing exhibits a rubber hardness of A50 to A65 (as measured according to testing method specified in Japanese Industrial Standard (JIS) K6253).

6. The miniature portable equipment as claimed in claim 1, which is a wristwatch.

7. The miniature portable equipment as claimed in claim 6, which is a wristwatch having a movement of long-life specification wherein use is made of a long-life battery or a solar cell, or having a movement of mechanical specification wherein no battery is needed.

8. The miniature portable equipment as claimed in claim 1, which is a miniature portable information equipment terminal.

9. The miniature portable equipment as claimed in claim 2, wherein the butyl rubber is contained in the packing in an amount of 45.0 to 65.0% by weight.

10. The miniature portable equipment as claimed in claim 2, wherein the packing exhibits a compression set of 15% or less as measured under a compression ratio of 25% at 80° C. after 72 hr (according to testing method specified in Japanese Industrial Standard (JIS) K6262).

11. The miniature portable equipment as claimed in claim 3, wherein the packing exhibits a compression set of 15% or less as measured under a compression ratio of 25% at 80° C. after 72 hr (according to testing method specified in Japanese Industrial Standard (JIS) K6262).

12. The miniature portable equipment as claimed in claim 2, wherein the packing exhibits a rubber hardness of A50 to A65 (as measured according to testing method specified in Japanese Industrial Standard (JIS) K6253).

13. The miniature portable equipment as claimed in claim 3, wherein the packing exhibits a rubber hardness of A50 to A65 (as measured according to testing method specified in Japanese Industrial Standard (JIS) K6253).

14. The miniature portable equipment as claimed in claim 4, wherein the packing exhibits a rubber hardness of A50 to A65 (as measured according to testing method specified in Japanese Industrial Standard (JIS) K6253).

15. The miniature portable equipment as claimed in claim 2, which is a wristwatch.

16. The miniature portable equipment as claimed in claim 3, which is a wristwatch.

17. The miniature portable equipment as claimed in claim 4, which is a wristwatch.

18. The miniature portable equipment as claimed in claim 5, which is a wristwatch.

19. The miniature portable equipment as claimed in claim 2, which is a miniature portable information equipment terminal.

20. The miniature portable equipment as claimed in claim 5, which is a miniature portable information equipment terminal.

21. The miniature portable equipment as claimed in claim 4, which is a miniature portable information equipment terminal.

22. The miniature portable equipment as claimed in claim 5, which is a miniature portable information equipment terminal.

* * * * *

UNITED STATES PATENT AND TRADEMARK OFFICE
CERTIFICATE OF CORRECTION

PATENT NO.        : 7,138,473 B2
APPLICATION NO. : 10/276870
DATED             : November 21, 2007
INVENTOR(S)       : Kigawa et al.

It is certified that error appears in the above-identified patent and that said Letters Patent is hereby corrected as shown below:

Column 2, Line 10, "the compression set." should read
-- the compression set are large. --

Column 16, Lines 19-20, Claim 20, "as claimed in claim 5," should read
-- as claimed in claim 3, --

Signed and Sealed this

Tenth Day of April, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,138,473 B2 |
| APPLICATION NO. | : 10/276870 |
| DATED | : November 21, 2006 |
| INVENTOR(S) | : Kigawa et al. |

It is certified that error appears in the above-identified patent and that said Letters Patent is hereby corrected as shown below:

Column 2, Line 10, "the compression set." should read
-- the compression set are large. --

Column 16, Lines 19-20, Claim 20, "as claimed in claim 5," should read
-- as claimed in claim 3, --

This certificate supersedes Certificate of Correction issued April 10, 2007.

Signed and Sealed this

Eighth Day of May, 2007

JON W. DUDAS
*Director of the United States Patent and Trademark Office*